(12) United States Patent
Tanna

(10) Patent No.: US 9,334,455 B2
(45) Date of Patent: May 10, 2016

(54) METHODS AND APPARATUSES FOR ENHANCED ABSORPTION OF ACID GAS COMPONENTS FROM SOUR FEED GAS

(71) Applicant: UOP LLC, Des Plaines, IL (US)

(72) Inventor: Nikunj Tanna, Haryana (IN)

(73) Assignee: UOP LLC, Des Plaines, IL (US)

( * ) Notice: Subject to any disclaimer, the term of this patent is extended or adjusted under 35 U.S.C. 154(b) by 266 days.

(21) Appl. No.: 13/931,655

(22) Filed: Jun. 28, 2013

(65) Prior Publication Data
US 2015/0005564 A1    Jan. 1, 2015

(51) Int. Cl.
*C10L 3/10* (2006.01)
*B01D 53/14* (2006.01)

(52) U.S. Cl.
CPC ............ *C10L 3/103* (2013.01); *B01D 53/1406* (2013.01); *B01D 53/1425* (2013.01); *B01D 53/1462* (2013.01); *C10L 3/104* (2013.01); *B01D 2251/306* (2013.01); *B01D 2252/204* (2013.01); *B01D 2252/2026* (2013.01); *B01D 2256/24* (2013.01); *C10L 2290/06* (2013.01); *C10L 2290/10* (2013.01); *C10L 2290/12* (2013.01); *C10L 2290/541* (2013.01)

(58) Field of Classification Search
None
See application file for complete search history.

(56) References Cited

U.S. PATENT DOCUMENTS

| | | | |
|---|---|---|---|
| 4,364,915 A | 12/1982 | Proctor | |
| 4,532,116 A | 7/1985 | Doerges et al. | |
| 4,548,620 A | 10/1985 | Albiol | |
| 5,001,902 A | 3/1991 | Garbo | |
| 6,800,120 B1 | 10/2004 | Won et al. | |
| 6,884,282 B2 | 4/2005 | Stevens et al. | |
| 8,080,089 B1 | 12/2011 | Wen et al. | |
| 8,361,424 B2 | 1/2013 | Bouillon et al. | |
| 8,361,425 B2 | 1/2013 | Lund et al. | |
| 2003/0021744 A1 | 1/2003 | DeBerry et al. | |
| 2005/0172807 A1 | 8/2005 | Mak | |
| 2010/0003177 A1 | 1/2010 | Aroonwilas et al. | |

(Continued)

FOREIGN PATENT DOCUMENTS

| EP | 2540376 A1 | 1/2013 |
|---|---|---|
| WO | 2009158064 A2 | 12/2009 |
| WO | 2012094089 A1 | 7/2012 |

OTHER PUBLICATIONS

Karimi, et al., "Capital Costs and Energy Considerations of Different Alternative Stripper Configurations for Post Combustion CO2 Capture," Chemical Engineering Research and Design, vol. 89, Issue 8, Aug. 2011, pp. 1229-1236.

(Continued)

*Primary Examiner* — Tam M Nguyen

(57) ABSTRACT

Methods and apparatuses for enhancing absorption of acid gas components from sour feed gas are provided. In an embodiment, a method for processing a gas includes contacting a feed gas stream which comprises hydrocarbon and hydrogen sulfide and carbon dioxide with a liquid absorbent in a multistage counterflow absorption zone to absorb hydrogen sulfide and carbon dioxide from the feed gas stream into the liquid absorbent. The method produces an effluent liquid stream rich in hydrogen sulfide and carbon dioxide and a treated gas stream. Further, the method includes removing a portion of the liquid absorbent from an interstage location in the multistage counterflow absorption zone. The portion of the liquid absorbent is cooled to form a cooled portion, and the cooled portion is returned to the interstage location.

16 Claims, 3 Drawing Sheets

(56) References Cited

U.S. PATENT DOCUMENTS

| | | |
|---|---|---|
| 2011/0088553 A1 | 4/2011 | Woodhouse et al. |
| 2011/0120309 A1 | 5/2011 | Baburao et al. |
| 2011/0126715 A1 | 6/2011 | Kimura |
| 2011/0168020 A1 | 7/2011 | Baburao et al. |
| 2012/0160099 A1 | 6/2012 | Shoji et al. |
| 2012/0235087 A1 | 9/2012 | Handagama et al. |
| 2012/0328501 A1 | 12/2012 | Iijima et al. |

OTHER PUBLICATIONS

Wu, et al., "Application of New Technologies on High H2s Gas Conditioning in the Puguang Gas Field," Natural Gas Industry, vol. 31, Issue 5, May 25, 2011, pp. 99-102.

Search Report dated Oct. 16, 2014 for corresponding PCT Appl. No. PCT/US2014/041890.

METHODS AND APPARATUSES FOR ENHANCED ABSORPTION OF ACID GAS COMPONENTS FROM SOUR FEED GAS

TECHNICAL FIELD

The technical field generally relates to methods and apparatuses for removing acid gas components from sour feed gas, and more particularly relates to methods and apparatuses for enhancing absorption of acid gas components from sour feed gas.

BACKGROUND

The gas industry has long been interested in sulfur recovery technology for applications to gaseous streams resulting from the treatment of "sour" natural or synthetic gas (also referred to as "sour gas" herein) resources to render them commercially useful. Many gas resources contain significant quantities of hydrogen sulfide, carbon dioxide and other contaminants, including, for example, aromatic hydrocarbons, benzene, toluene, mixed xylenes, ethylbenzene, and the like, rendering them unsuitable for commercial use.

Sour gas can cause extensive damage to the gas containing equipment if not properly processed. The combustion of sulfur compounds produces serious air pollutants and eventually produces acid rain when combined with water. These sulfur compounds are poisonous and lethal to humans and animals, and are corrosive to metals and other materials used for the handling and transporting gas.

In order to reduce health and environmental hazards and to meet industry specifications, the hydrogen sulfide and carbon dioxide concentrations in sour gas are ordinarily reduced by regenerative gas-treatment systems. These systems typically contact a sour gas directed into an absorption column with an absorption solution that removes hydrogen sulfide, carbon dioxide and other substances, such as light mercaptans, carbonyl sulfide, from the sour gas. The absorption solution is then regenerated and reused in the system. Recovered hydrogen sulfide is either burned off into the atmosphere or, more commonly, directed to a sulfur recovery plant, such as a Claus plant. Similarly the recovered carbon dioxide can be used as an inert gas or a raw material for food and chemical industries, and agricultural applications. The process of removing hydrogen sulfide, carbon dioxide, and other impurities is referred to as sour gas sweetening.

When sour feed gas is sweetened, the absorbent may exhibit an increase in temperature. Such an increase may occur due to an exothermic reaction, or due to physical characteristics of the process.

Accordingly, it is desirable to provide novel methods and apparatuses for enhancing absorption of acid gas components from sour feed gas. It is also desirable to provide methods and apparatuses for providing interstage cooling of liquid absorbent in columns for absorbing acid gas components. Furthermore, other desirable features and characteristics will become apparent from the subsequent detailed description and the appended claims, taken in conjunction with the accompanying drawings and the foregoing technical field and background.

BRIEF SUMMARY

Methods and apparatuses for enhancing the absorption of acid gas components from sour feed gas are provided. In an exemplary embodiment, a method for processing a gas includes contacting a feed gas stream, which comprises a hydrocarbon and hydrogen sulfide, carbon dioxide and other acidic gases with a liquid absorbent in a multistage counterflow absorption zone to absorb hydrogen sulfide and carbon dioxide from the feed gas stream into the liquid absorbent. The method produces an effluent liquid stream rich in hydrogen sulfide and/or carbon dioxide and a treated gas stream. Further, the method includes removing a portion of the liquid absorbent from an interstage location in the absorption zone. The portion of the liquid absorbent is cooled to form a cooled portion, and the cooled portion is returned to the interstage location in the absorption zone.

In another embodiment, a method for absorbing acid gas components from a sour feed gas is provided. The method includes providing the sour feed gas including a product gas and the acid gas components. Further, the method provides a liquid absorbent. The sour feed gas is passed upward and the liquid absorbent downward through a counterflow column and the sour feed gas and the liquid absorbent are contacted at contacting stages therein to absorb the acid gas components into the liquid absorbent. The method includes removing substantially all of the liquid absorbent from the counterflow column at an interstage location. Further, the method includes cooling the liquid absorbent to form a cooled liquid absorbent stream. In the method, the cooled liquid absorbent stream is returned to the counterflow column at the interstage location. Also, a sweetened gas stream is emitted from the counterflow column.

In another embodiment, an apparatus for absorbing acid gas components from a sour feed gas is provided. The apparatus includes a multistage counterflow absorption zone configured to absorb hydrogen sulfide and carbon dioxide from the feed gas stream into a liquid absorbent to form a sweetened gas. Further, the apparatus includes a cooling apparatus in fluid communication with an interstage location in the multistage counterflow absorption zone and configured to remove a portion of the liquid absorbent from the interstage location, to cool the portion of the liquid absorbent, and to return the portion of the liquid absorbent to the interstage location.

BRIEF DESCRIPTION OF THE DRAWINGS

Embodiments of methods and apparatuses for enhancing absorption of acid gas components from sour feed gas will hereinafter be described in conjunction with the following drawing figures, wherein like numerals denote like elements, and wherein.

DETAILED DESCRIPTION

The following detailed description is merely exemplary in nature and is not intended to limit the methods or apparatuses for enhancing absorption of acid gas components from sour feed gas, by means of a physical or a chemical absorbent or a combination thereof. Furthermore, there is no intention to be bound by any theory presented in the preceding background or the following detailed description.

Methods and apparatuses for processing hydrocarbons, and more particularly, for absorbing acid gas components from sour feed gases are provided herein. The methods and apparatuses enable improved control over the temperature of the liquid absorbent such that temperature bulges, or high liquid absorbent temperatures in general, may be avoided. The feed gases may include natural gas, syngas, or off gases from refineries, such as from indirect alkylation units, distillate catalytic hydrotreating units, gasoline desulfurization units, naphtha hydrotreating units, LPG recovery units, kerosene catalytic hydrotreating units, and the like, without limitation.

Figure 1:
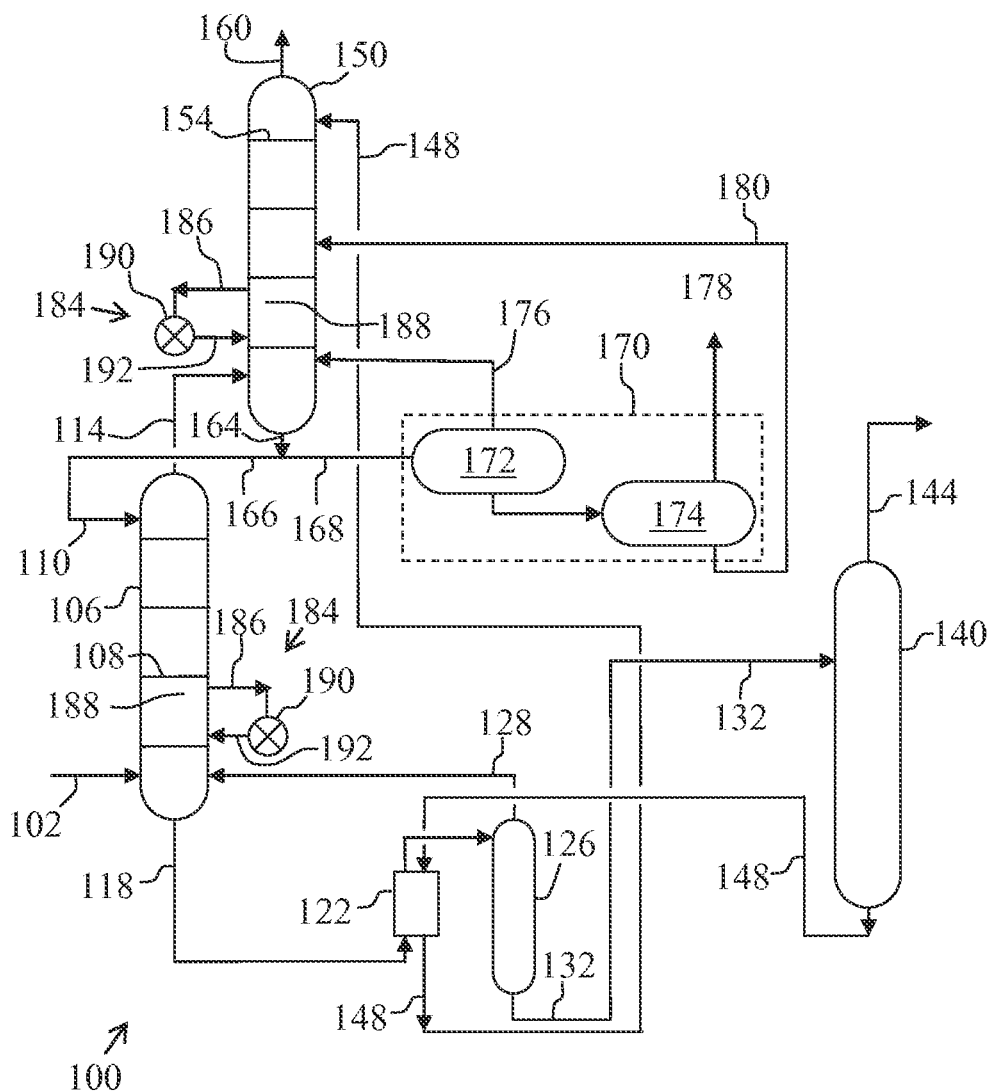
FIG. 1 is a schematic diagram of an embodiment of an apparatus and method for enhancing absorption of acid gas components from sour feed gas with a physical absorbent in accordance with an embodiment.

FIG. 1 is a simplified process flow diagram illustrating several embodiments of an apparatus and method for absorbing acid gas components from a sour feed gas while providing interstage cooling of the solvent. This process flow diagram has been simplified in that it does not show the many pieces of mechanical apparatus normally found on such a process including pumps, process coolers and heaters, pressure, temperature and flow rate monitoring and control systems, vessel internals, stripping column reflux and reboiling systems, etc.

As shown, a hydrocarbon processing apparatus 100 receives a sour feed gas stream 102, which, in an exemplary embodiment, comprises an admixture of methane, ethane, hydrogen sulfide, and carbon dioxide. As shown, the feed gas stream 102 enters a sulfide absorption column 106 that includes a series of contacting stages 108. The feed gas stream 102 travels upward through the sulfide absorption column countercurrently to a descending liquid stream 110, such as a liquid absorbent.

In the exemplary embodiment of FIG. 1, the liquid stream 110 includes a physical absorbent. An exemplary physical absorbent is a mixture of dimethyl ethers of polyethylene glycol with the empirical formula of $CH_3(CH_2CH_2O)_nCH_3$ where n is between 3 and 9. As used herein, the phrase "physical absorbent" means a solvent that absorbs a selected component by physical characteristics and not through a chemical reaction. Physical absorption may be particularly well-suited to pre-combustion acid gas removal due to the relatively high pressure that exists before combustion. For example, gasification of feedstock may occur at elevated pressures and temperatures. Consequently, the gas produced by the gasification process may exist at an elevated pressure, for example a pressure greater than or equal to about 2000 kPa. Other examples of elevated pressures, include, but are not limited to, pressures ranging from approximately 800 kPa to 7000 kPa. At elevated pressures, the absorption capacity of physical solvents may increase, and therefore physical absorption may provide increased efficiencies for pre-combustion applications.

In the exemplary embodiment of FIG. 1, the exemplary liquid stream 110 is preloaded with carbon dioxide to inhibit absorption of carbon dioxide present in the feed gas stream 102 onto the physical solvent. When carbon dioxide is absorbed onto the physical solvent, the liquid stream 110 will exhibit a temperature rise across the column.

The absorption column 106 is operated at conditions, which effect a fairly selective removal of a portion of the hydrogen sulfide from the feed gas stream 102 to result in the production of a lean gas stream 114 that has a lower hydrogen sulfide concentration than the feed gas stream 102, but that still contains substantially all of the other components of the feed gas stream 102 at the same quantity as the feed gas stream 102.

An effluent liquid absorbent or solvent stream 118 that is relatively rich in hydrogen sulfide as compared to the liquid stream 110 is removed through the bottom of the absorption column 106 and is sent to a regeneration zone. As shown, the hydrogen sulfide rich solvent stream 118 is sent through a heat exchanger 122 where the hydrogen sulfide rich solvent stream 118 is heated. The hydrogen sulfide rich solvent stream 118 is then sent to a concentrator 126, which runs at a higher temperature than the sulfide absorption column 106 to remove carbon dioxide. The carbon dioxide is recycled to the sulfide absorption column 106 as stream 128.

The concentrator 126 forms a concentrated hydrogen sulfide rich solvent stream 132 that is sent to a sulfide stripping column 140 for regeneration of the solvent. The sulfide stripping column 140 removes the hydrogen sulfide from the concentrated hydrogen sulfide rich solvent stream 132 and forms a hydrogen sulfide rich stream 144 that exits through the top of the sulfide stripping column 140 as acid gas containing greater than about 30% hydrogen sulfide. The sulfide stripping column 140 may be further outfitted with a reflux and reboiler as is known in the art.

The regenerated solvent stream 148 leaves through the bottom of the sulfide stripping column 140. As shown, the regenerated solvent stream 148 passes through the heat exchanger 122 and is cooled by heat exchange with the incoming hydrogen sulfide rich solvent stream 118. The regenerated solvent stream 148 may be cooled further, such as by $NH_3$ or propane based refrigeration, and then is sent to a carbon dioxide absorption column 150.

As shown, after exiting the sulfide absorption column 106, the lean gas stream 114 comprising the remaining components of the feed gas stream, including carbon dioxide, is transferred to the carbon dioxide absorption column 150. The lean gas stream 114 passes upward countercurrent to the solvent stream 148 through a series of contacting stages 154 in the carbon dioxide absorption column 150. At the contacting stages 154, the solvent stream 148 absorbs the carbon dioxide from the lean gas stream 114. As a result, a sweetened gas stream 160 is formed and exits the top of the carbon dioxide absorption column 150. Further, a carbon dioxide rich solvent stream 164 is formed and is discharged from the bottom of the carbon dioxide absorption column 150.

As shown, the carbon dioxide rich solvent stream 164 is split into a first portion 166, which is sent to the sulfide absorption column 106 as the carbon dioxide saturated solvent liquid stream 110, and a second portion 168, which is sent to a carbon dioxide solvent regeneration zone 170. The carbon dioxide solvent regeneration zone 170 is comprised of two flash vessels 172 and 174. The first flash vessel 172 recovers any hydrogen that has been absorbed in the solvent 164 and delivers it back to the carbon dioxide absorption column 150 as stream 176. The second flash tank 174 removes most of the carbon dioxide as stream 178, which may be processed further to make a pure carbon dioxide end product. The remaining semi-lean solvent stream 180 is then recycled for use in the carbon dioxide absorption column 150.

In the embodiment of FIG. 1, each absorption column 106 and 150 provides for interstage cooling of solvent. Specifically, each absorption column 106 and 150 includes a solvent cooling apparatus 184 in communication with an absorption zone formed by the contacting stages 108 and 154, respectively. As a result, liquid solvent 186 is removed from interstage locations 188 in the absorption zones. The liquid solvent 186 is cooled by coolers 190, such as a heat exchanger, chiller, or other known devices. Cooled liquid solvent 192 is then returned to the interstage locations 188. This can also be accomplished with the help of stabbed in cooling arrangements.

The solvent cooling apparatuses 184 may remove substantially all of, or a portion of, the liquid solvent 186 at the interstage locations 188. As shown, the coolers 190 solely cool the liquid solvent 186 removed from the interstage locations 188 without adding any other streams to the solvent 186 or 192. In an exemplary embodiment, the coolers 190 cool the liquid solvent 186 by about five degrees, or by about ten degrees, or by at least about ten degrees, before returning the cooled liquid solvent 192 to the interstage locations 188. In other embodiments, the coolers 190 cool the liquid solvent 186 by at least about twenty degrees before returning the cooled liquid solvent 192 to the interstage locations 188.

Figure 2:
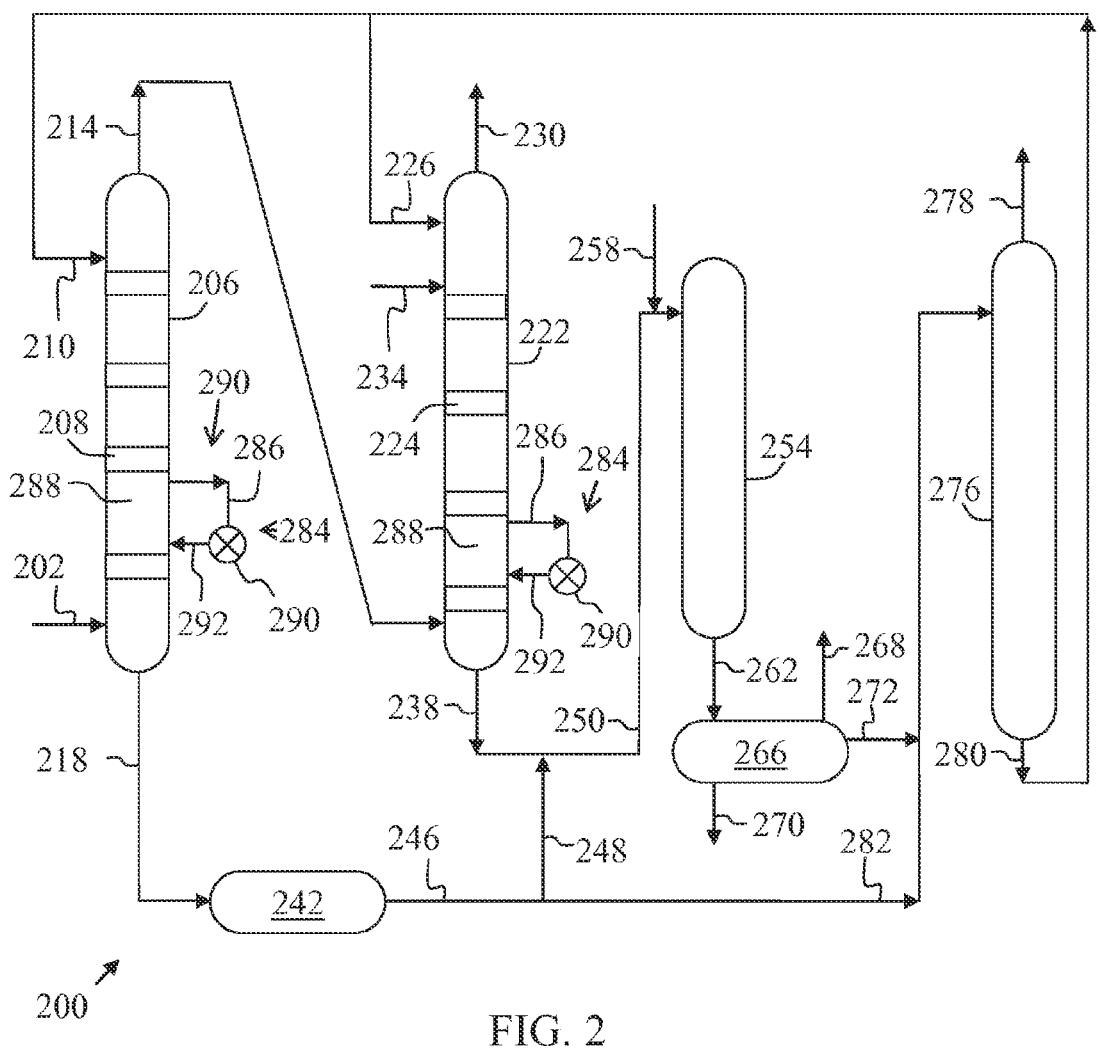
FIG. 2 is a schematic diagram of an embodiment of an apparatus and method for enhancing absorption of acid gas components from sour feed gas with a carbonate based absorbent in accordance with an embodiment.

FIG. 2 is a simplified process flow diagram illustrating several embodiments of another apparatus and method providing interstage cooling of solvent. This process flow diagram has been simplified in that it does not show the many pieces of mechanical apparatus normally found on such a process including pumps, pressure, temperature and flow rate monitoring and control systems, vessel internals, stripping column reflux and reboiling systems, etc.

In FIG. 2, the hydrocarbon processing apparatus 200 receives an exemplary feed gas stream 202, which, as in the exemplary embodiment of FIG. 1, comprises an admixture of methane, ethane, hydrogen sulfide, and carbon dioxide. As shown, the feed gas stream 202 enters a preliminary absorption column 206 that includes a series of contacting stages 208. The feed gas stream 202 travels upward through the absorption column countercurrently to a descending solvent stream 210, such as a liquid absorbent.

In the exemplary embodiment of FIG. 2, the solvent stream 210 comprises an aqueous potassium carbonate solution, which may or may not be activated. The absorption column 206 is operated at conditions, which effect a fairly selective removal of a portion of the hydrogen sulfide from the feed gas stream 202 to result in the production of a lean gas stream 214 that has a lower hydrogen sulfide concentration than the feed gas stream 202 but still contains substantially all of the other components of the feed gas stream 202 at the same quantity as the feed gas stream 202. An effluent liquid absorbent or solvent stream 218 that is relatively rich in hydrogen sulfide as compared to the solvent stream 210 exits the adsorption column 206.

After passing through the absorption column 206, the lean gas stream 214, including the remaining components of the feed gas stream, is transferred to the main absorption column 222. As shown, the main absorption column 222 includes a series of contacting stages 224. The lean gas stream 214 passes upward countercurrent to a lean solvent stream 226, such as an aqueous potassium carbonate solution, which may or may not be activated, delivered to the top of the absorption column 222. Absorption column 222 is maintained at conditions, which result in the transfer of substantially all the hydrogen sulfide and carbon dioxide present in the entering gases to the solvent stream 226 and thereby produces a treated or sweetened gas stream 230 that is free of hydrogen sulfide and carbon dioxide. If desired, a supplemental air stream 234 may be injected into an upper portion of the absorption column 222 to affect the oxidation of any residual amount of hydrogen sulfide present in the upper portion of the absorption column 222. An effluent liquid absorbent or solvent stream 238, which is rich in both hydrogen sulfide and carbon dioxide is removed from the absorption column 222.

As shown, the hydrogen sulfide-rich solvent stream 218 enters a reaction zone 242 maintained at an elevated temperature. Preferably, in the presence of a catalyst, hydrogen sulfide reacts with thiosulfate present in the solvent stream 218. This results in a reduction of the thiosulfate to elemental sulfur and the production of stream 246, which comprises a mixture of the carbonate solution, polysulfides, and elemental sulfur. The carbonate solution at this point may still contain hydrogen sulfide absorbed in the absorption column 206. Stream 246 will normally flow through line 248 into solvent stream 238 that is withdrawn from the main absorption column 222 to form combined solvent stream 250 before being transferred into an oxidation zone 254. The combined solvent stream 250, comprising an aqueous carbonate solution, flows downward through a packed bed located within the oxidation zone 254 in admixture with carbon dioxide-enriched air 258.

In the oxidation zone 254, the hydrogen sulfide carried by the solvent stream 250 is preferably oxidized to elemental sulfur in a reaction, which is catalyzed by an oxidation catalyst present within the packed bed and a catalyst, which is dissolved in the solvent stream 250. The oxidation zone 254 is maintained at an elevated temperature, which results in the formation of the elemental sulfur in liquid form rather than in solid form. The effluent stream 262 exiting oxidation zone 254 therefore is a mixed phase stream comprising the residual components of the gas from stream 258, the aqueous carbonate solution of stream 250 (still containing carbon dioxide absorbed in the absorption columns 206 and 222) and liquid sulfur. The oxidation zone effluent stream 262 is passed into a phase separation zone 266 wherein, due to quiescent conditions and a suitable residence time, the entering materials separate into a vapor stream 268 comprising carbon dioxide and nitrogen, a decanted stream 270 of liquid phase sulfur, and the aqueous carbonate solution in solvent stream 272. The carbonate solution will contain water-soluble oxidation by-products including thiosulfate ions.

The solvent stream 272 is passed into a stripping zone 276. The stripping zone 276 is operated at suitable conditions including an elevated temperature and reduced pressure, which result in the release of the carbon dioxide present in the carbonate solution. This effects the production of a carbon dioxide off-gas stream 278, which is removed from the process and a lean carbonate solution that is withdrawn from the stripping zone as solvent stream 280 and is recycled to the absorption columns 206 and 222 as stream 210 and stream 226, respectively. The oxidation zone 254 and stripping zone 276 may be considered to form a regeneration zone for forming the regenerated solvent stream 280 from the effluent solvent streams 218 and 238. As an alternative mode of operation, a portion of the admixture in stream 246 may be passed through line 282. This alternative would be employed only when it is acceptable for hydrogen sulfide to be present in the carbon dioxide off-gas stream 278.

In the embodiment of FIG. 2, each absorption column 206 and 222 provides for interstage cooling of solvent. Specifically, each column 206 and 222 includes a solvent cooling apparatus 284 in communication with an absorption zone formed by the contacting stages 208 and 224, respectively. As a result, liquid solvent 286 is removed from interstage locations 288 in the absorption zones. The liquid solvent 286 is cooled by coolers 290, such as a heat exchanger, chiller, or other known devices. Cooled liquid solvent 292 is then returned to the interstage locations 288. This can also be accomplished with the help of stabbed in cooling arrangements.

The solvent cooling apparatuses 284 may remove substantially all, or a portion of, the liquid solvent 286 at the interstage locations 288. As shown, the coolers 290 solely cool the liquid solvent 286 removed from the interstage locations 288 without adding any other streams. In an exemplary embodiment, the coolers 290 cool the liquid solvent 286 by about ten degrees, such as from about 120° C. to about 110° C. before returning the cooled liquid solvent 292 to the interstage locations 288.

Figure 3:
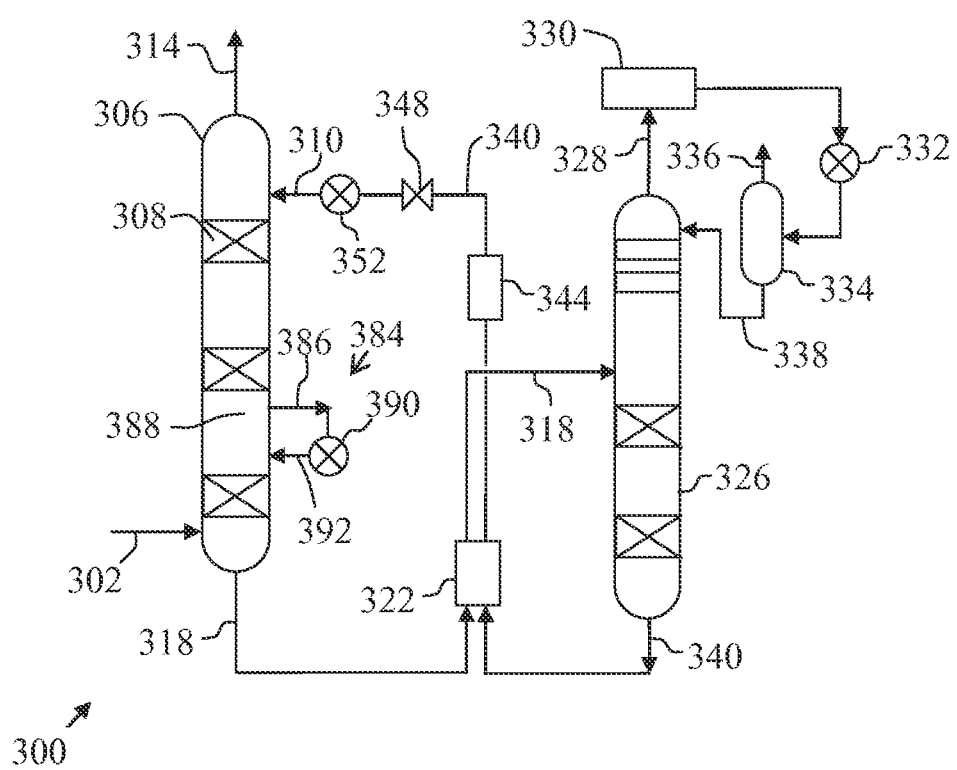
FIG. 3 is a schematic diagram of an embodiment of an apparatus and method for enhancing absorption of acid gas components from sour feed gas with an amine based absorbent in accordance with an embodiment.

FIG. 3 is a simplified process flow diagram illustrating several embodiments of another apparatus and method providing interstage cooling of solvent. This process flow diagram has been simplified in that it does not show the many pieces of mechanical apparatus normally found on such a process including pumps, pressure, temperature and flow rate monitoring and control systems, vessel internals, etc.

In FIG. 3, the hydrocarbon processing apparatus 300 receives a feed gas stream 302, which, in an exemplary embodiment, comprises an admixture of methane, ethane, hydrogen sulfide, and carbon dioxide. As shown, the feed gas stream 302 enters an absorption column 306 that includes a series of contacting stages 308. The feed gas stream 302 travels upward through the absorption column countercurrently to a descending solvent stream 310, such as a liquid absorbent.

In the exemplary embodiment of FIG. 3, the solvent stream 310 comprises an amine based absorbent, such as for example one of the various amines including monoethanol amine (MEA), diethanoamine (DEA), methyldiethanol amine (MDEA), mercaptamine, monomethyl methanolamine (MMEA), di-isopropanolamine (DIPA), and diglycolamine (DGA). The amine based absorbents can remove both carbon dioxide and hydrogen sulfide. The solvent stream 310 may further include an activator to enhance the absorption of $CO_2$ (amines easily react with $H_2S$, but their reaction with CO2 is facilitated by the activator). The activated amine solution is typically pre-formulated.

The absorption column 306 is operated at conditions, which effect a fairly selective removal of a portion of the hydrogen sulfide from the feed gas stream 302 to result in the production of a sweetened gas stream 314 that has a lower hydrogen sulfide and carbon dioxide concentration than the feed gas stream 302. After absorption of acid gas components from feed gas stream 302, the sweetened gas stream 314 exits the absorption column 306. While one absorption column 306 is illustrated in FIG. 3, it is contemplated that a series of columns be used in the apparatus 300 to further remove contaminants from sweetened gas stream 314.

As shown, an effluent liquid absorbent or solvent stream 318 that is relatively rich in hydrogen sulfide as compared to the solvent stream 310 exits the adsorption column 306. As shown, the hydrogen sulfide-rich solvent stream 318 passes through and is heated by a heat exchanger 322. Then the hydrogen sulfide-rich solvent stream 318 is delivered to an amine thermal regeneration column 326. In the thermal regeneration column 326, acid gases are removed from the hydrogen sulfide-rich solvent stream 318 by steam generated in reboiler. Acid gases exit the top of the thermal regeneration column 326 in stream 328 and are sent to a reflux condenser 330 and a trim condenser 332 before being introduced to a reflux drum 334. The reflux drum allows acid gas components to be separated from amine solution and exit the drum 334 as acid gas stream 336. The remaining liquid is returned to the thermal regeneration column 326 as stream 338.

After having the acid gas components thermally removed, the lean regenerated solvent stream 340 is formed and exits the thermal regeneration column 326. The lean regenerated solvent stream 340 passes through the heat exchanger 322 where it is cooled by exchange with the solvent stream 318. Thereafter, the regenerated solvent stream 340 may be cooled further in a cooler 344, such as a chiller or other cooling device. The regenerated solvent stream 340 the passes through filter 348. Then, the regenerated solvent stream 340 is sent to a trim cooler 352. In an exemplary, the regenerated solvent stream 340 is cooled to a temperature of about 45° C. As shown, the regenerated solvent stream 340 forms the solvent stream 310 fed into the absorbent column 306 to remove acid gas components from the feed gas stream 302.

In the embodiment of FIG. 3, the absorption column 306 provides for interstage cooling of solvent. Specifically, the column 306 includes a solvent cooling apparatus 384 in communication with an absorption zone formed by the contacting stages 308. As a result, liquid solvent 386 is removed from an interstage location 388 in the absorption zone. The liquid solvent 386 is cooled by a cooler 390, such as a heat exchanger, chiller, or other known devices. Cooled liquid solvent 392 is then returned to the interstage location 388. This can also be accomplished with the help of stabbed in cooling arrangements.

The solvent cooling apparatus 384 may remove substantially all, or a portion of, the liquid solvent 386 at the interstage location 388. As shown, the cooler 390 solely cool the liquid solvent 386 removed from the interstage location 388 without adding any other streams. In an exemplary embodiment, the cooler 390 cools the liquid solvent 386 by about ten degrees, such as from about 75° C. to about 65° C., or by about twenty degrees, such as from about 75° C. to about 55° C. before returning the cooled liquid solvent 392 to the interstage locations 388.

As described herein, apparatuses and methods for enhanced absorption of acid gas components from sour feed gases have been provided. In exemplary embodiments, an apparatus and method have been described for providing interstage cooling of liquid absorbent during absorption of acid gas components in a column.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the claimed subject matter in any way. Rather, the foregoing detailed description will provide those skilled in the art with a convenient road map for implementing an exemplary embodiment or embodiments. It being understood that various changes may be made in the function and arrangement of elements described in an exemplary embodiment without departing from the scope set forth in the appended claims.

What is claimed is:

1. A method for processing a gas, the method comprising the steps of:
    contacting a feed gas stream which comprises a hydrocarbon and hydrogen sulfide and carbon dioxide with a liquid absorbent preloaded with carbon oxide in a first stage of a multistage counterflow absorption zone to absorb hydrogen sulfide to provide a lean gas stream having reduced hydrogen sulfide concentration and an effluent liquid stream rich in hydrogen sulfide, the effluent liquid stream being sent for regeneration wherein said first stage is within a first absorbent column; and
    passing the lean gas stream to a second stage of the multistage counterflow absorption zone to absorb carbon dioxide from the lean gas stream into a second liquid absorbent comprising at least a portion of the regenerated effluent liquid stream, and producing a treated gas stream, wherein said second stage is within a second absorbent column;

removing a portion of the liquid absorbent and a portion of the second liquid absorbent from an interstage location in the multistage counterflow absorption zone;

cooling the portion of the liquid absorbent and the second liquid absorbent to form a cooled portion; and returning the cooled portion to the interstage location.

2. The method of claim 1 further comprising the steps of:

passing the effluent liquid stream into a regeneration zone and removing hydrogen sulfide from the effluent liquid stream to form a lean absorbent stream; and recycling the lean absorbent stream to the multistage counterflow absorption zone for contact with the lean gas stream.

3. The method of claim 1 wherein the liquid absorbent comprises an aqueous carbonate solution.

4. The method of claim 1 wherein the liquid absorbent comprises an aqueous carbonate solution, and wherein the method further comprises the steps of:

passing the effluent liquid stream into a regeneration zone and removing hydrogen sulfide from the effluent liquid stream to form a lean absorbent stream; and recycling the lean absorbent stream to the multistage counterflow absorption zone for contact with the lean gas stream.

5. The method of claim 4 wherein passing the effluent liquid stream into a regeneration zone comprises passing the effluent liquid stream into an oxidizer zone and admixing the effluent liquid stream with an oxygen-containing gas stream in the presence of an oxidation catalyst.

6. The method of claim 1 wherein the liquid absorbent comprises a physical absorbent.

7. The method of claim 1 wherein the liquid absorbent comprises a physical absorbent, and wherein contacting a feed gas stream which comprises a hydrocarbon and hydrogen sulfide with a liquid absorbent in a multistage counterflow absorption zone comprises absorbing carbon dioxide onto the physical absorbent.

8. The method of claim 1 wherein the liquid absorbent comprises an amine-based absorbent.

9. A method for absorbing acid gas components from a sour feed gas, the method comprising the steps of:

providing the sour feed gas including a product gas and the acid gas components;

providing a physical absorbent;

passing the sour feed gas upward and the physical absorbent downward through a counterflow column and contacting the sour feed gas and the physical absorbent at contacting stages therein to absorb the acid gas components into the physical absorbent;

removing substantially all of the physical absorbent from the counterflow column at an interstage location;

cooling the physical absorbent to form a cooled physical absorbent stream;

returning the cooled physical absorbent stream to the counterflow column at the interstage location; and emitting a sweetened gas stream from the counterflow column;

and further comprising passing the sweetened gas stream upward and a liquid absorbent downward through a second counterflow column and contacting the sweetened gas stream and the liquid absorbent at contacting stages therein to absorb acid gas components into the liquid absorbent;

removing the liquid absorbent from the second counterflow column at a second interstage location;

cooling the liquid absorbent to form a cooled liquid absorbent stream;

returning the cooled liquid absorbent stream to the counterflow column at the second interstage location;

discharging a effluent liquid absorbent stream comprising the liquid absorbent and absorbed acid gas components; and emitting a sweetened product gas stream from the second counterflow column.

10. The method of claim 9 further comprising discharging an effluent physical absorbent stream comprising the physical absorbent and absorbed acid gas components.

11. The method of claim 10 further comprising passing the effluent physical absorbent stream through a regeneration apparatus, removing substantially all of the acid gas components from the effluent physical absorbent stream, and generating a stream of the acid gas components.

12. The method of claim 11 wherein:

providing the sour feed gas comprises providing the sour feed gas including the product gas, hydrogen sulfide and carbon dioxide;

contacting the sour feed gas and the physical absorbent at contacting stages comprises absorbing the hydrogen sulfide and carbon dioxide into the physical absorbent; and generating a stream of the acid gas components comprises generating a stream of the hydrogen sulfide and carbon dioxide.

13. The method of claim 9 further comprising passing the effluent physical absorbent stream and the effluent liquid absorbent stream through a regeneration apparatus, removing substantially all of the acid gas components from the effluent physical absorbent stream and the effluent liquid absorbent stream, and generating a stream of the acid gas components.

14. The method of claim 9 wherein the liquid absorbent comprise a physical solvent.

15. The method of claim 9 wherein cooling the physical absorbent to form a cooled physical absorbent stream comprises cooling the liquid absorbent by about 10° C.

16. The method of claim 9 wherein cooling the physical absorbent to form a cooled physical absorbent stream comprises cooling the physical absorbent from a temperature of about 100° C. to form the cooled physical absorbent stream at a temperature of about 90° C.

\* \* \* \* \*